(12) United States Patent
Hedström

(10) Patent No.: US 6,499,339 B1
(45) Date of Patent: Dec. 31, 2002

(54) METHOD AND AN APPARATUS FOR MEASURING THE LOAD-BEARING CAPACITY OF A ROAD SURFACE

(75) Inventor: Hans Hedström, Stockholm (SE)

(73) Assignee: Megascale AB, Stockholm (SE)

( * ) Notice: Subject to any disclaimer, the term of this patent is extended or adjusted under 35 U.S.C. 154(b) by 0 days.

(21) Appl. No.: 09/890,278
(22) PCT Filed: Feb. 9, 2000
(86) PCT No.: PCT/SE00/00255
§ 371 (c)(1),
(2), (4) Date: Aug. 10, 2001
(87) PCT Pub. No.: WO00/47973
PCT Pub. Date: Aug. 17, 2000

(30) Foreign Application Priority Data

Feb. 11, 1999 (SE) .................................................. 9900452

(51) Int. Cl.[7] .............................. G01N 3/42; G01N 3/48
(52) U.S. Cl. ................................... 73/81; 73/82; 73/146
(58) Field of Search ............................ 73/81, 82, 83, 73/84, 85, 146, 786, 824

(56) References Cited

U.S. PATENT DOCUMENTS

| | | | | |
|---|---|---|---|---|
| 1,430,261 A | * | 9/1922 | Repper ............................ | 73/82 |
| 2,348,782 A | * | 5/1944 | Bollee et al. .................... | 73/81 |
| 2,370,784 A | * | 3/1945 | Edwards ........................ | 177/2 |
| 2,942,458 A | * | 6/1960 | Kerr ................................ | 73/82 |
| 3,339,404 A | * | 9/1967 | Brooks et al. .................. | 73/84 |
| 4,456,829 A | | 6/1984 | Fohey ........................... | 250/560 |
| 4,571,695 A | | 2/1986 | Elton et al. .................... | 364/550 |
| 4,653,316 A | | 3/1987 | Fukuhara ........................ | 73/146 |
| 4,658,639 A | * | 4/1987 | Arnberg .......................... | 73/84 |
| 4,781,058 A | | 11/1988 | Arnberg ......................... | 73/84 |
| 4,899,296 A | | 2/1990 | Khattak ........................ | 364/550 |
| 5,510,889 A | | 4/1996 | Herr ............................. | 356/5.1 |
| 6,119,353 A | * | 9/2000 | Gronskov ...................... | 33/1 Q |

FOREIGN PATENT DOCUMENTS

WO 96/31655 10/1996

\* cited by examiner

Primary Examiner—Hezron Williams
Assistant Examiner—Charles D Garber
(74) Attorney, Agent, or Firm—Jacobson Holman PLLC

(57) ABSTRACT

A method and an apparatus for determining the resiliency of a road surface include a vehicle (1) that is caused to move along the road surface (3) and that exerts a load on said surface with one wheel (2). A ball of plastic material (16) is shot onto the road surface (3) so as to adhere thereto in the movement path of two measuring arrangements (8, 9; 18, 19) which are separated in the direction of movement of the vehicle (1) and by means of which the vertical distance is measured between the upper side of the ball (16) adhering to the road surface (3) and a vehicle-carried reference in two positions along the vehicle. The distance between the reference and the measuring body can be established in several positions along the vehicle (1), for determining the deflection curve of the road surface.

8 Claims, 1 Drawing Sheet

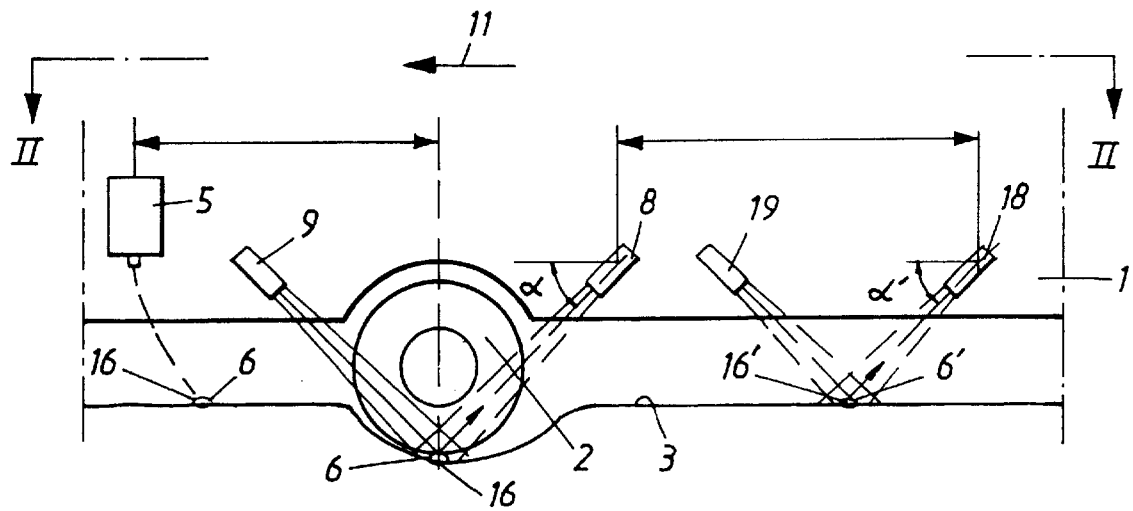
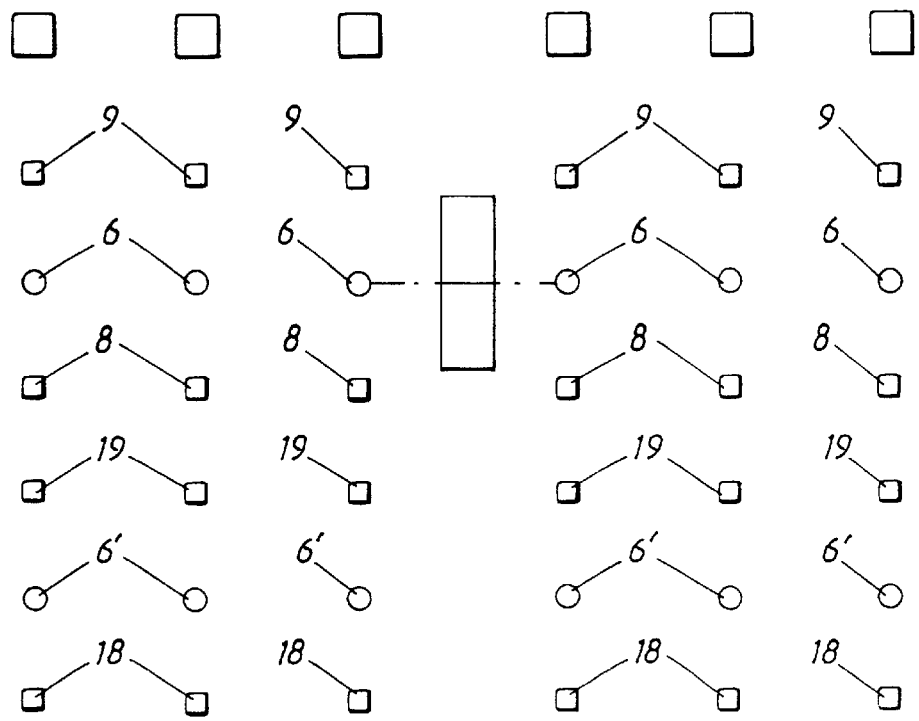

METHOD AND AN APPARATUS FOR MEASURING THE LOAD-BEARING CAPACITY OF A ROAD SURFACE

The invention relates to a method and to an apparatus for determining the load bearing capacity of a road surface, in accordance with the preamble of the independent method claim and the independent apparatus claim respectively.

BACKGROUND OF THE INVENTION

Thus, it is well known to determine the bearing capacity of a road surface by measuring its elastic resiliency, for instance by driving a vehicle along the road and loading the road surface with a specific force via a small loading area that moves with the vehicle, for instance via a vehicle rear wheel, wherewith at least two measurements are taken at each chosen measuring position on the road surface, said measurements being taken at different distances in the direction of vehicle movement. For instance, one measurement can be taken when the measuring area is located closely adjacent to the loading area, and when the measuring area is located relatively far from the loading area and the road surface is still unaffected by the load or has sprung back resiliently when the load is removed from said area. The measuring operation involves detecting the vertical distance between the measuring location and a vehicle mounted reference. The measurement is carried out suitably with the aid of some contactless process. The bearing capacity of the road surface can be determined, by measuring the elastic deformation of said surface in the area around the loading area.

U.S. Pat. Nos. 4,781,058, 4,571,695, 4,456,829, DE-A1-36 43 470 and WO 96/31655 are prior publications that teach the present state of techniques.

One problem with present technology is that the road surface is relatively uneven and that it is difficult to carry out the second measuring process at the same place on the road surface as that on which the first measurement was taken. It is, of course, possible to try to read the surface pattern of the road surface at the measuring location in conjunction with the first measuring process, and to try to identify this pattern in conjunction with the second measuring process and to carry out said second measuring process at the correct location. The difficulty here, however, is that the smoother the road surface, the more difficult it is to recognise the pattern.

The choice of a relatively wide measuring area carries with it a serious risk of losing valuable information. On the other hand, if it is elected to carry out the first measuring process in a very small measuring area, there is a serious danger that the process will result in erroneous measurements unless the second measuring process is carried out at precisely the same position as the first measuring process, due to the fact that the road surface will often have irregularities in the order of a millimetre whereas the elastic depression of the road surface often lies in the order of up to some millimetres.

SUMMARY OF THE INVENTION

The object of the present invention is to provide a solution to this problem. The aim of the invention is thus to provide a technique that will enable the measuring position to be re-found easily in conjunction with the second measuring process, and to provide a smooth measuring surface in said measuring location so as to avoid the drawback associated with irregularities in or the unevenness' of the road surface.

This object is achieved by means of the invention as defined in the accompanying independent method claim.

The object is also achieved by means of the apparatus defined in the accompanying independent apparatus claim.

Other embodiments of the invention are set forth in the accompanying dependent claims.

Basically, the invention entails placing a measuring body out on the road surface. Both the first and the second measuring processes are carried out on this measuring body. The measuring body is chosen so that it can be easily detected, so that both measuring processes can be carried out at one and the same location. The measuring body is also conveniently designed to provide an essentially smooth measuring surface.

In one embodiment of the invention, there is formed a ball of relatively soft asphalt which is projected from the vehicle onto the road surface such that the ball sticks firmly to said surface while being flattened to some extent by its impact therewith. The ball is preferably projected so that it strikes the road surface at a position that is swept by two vehicle-mounted distance detectors or sensors. Naturally, the ball may alternatively be thrown to land on the road surface at a predetermined distance from the nearest measuring apparatus, so that the time distance between projection of the ball and the time at which the ball lands on the measuring area of the measuring apparatus can be determined on the basis of the current speed of the vehicle and on other factors.

The time point at which the measuring area of the second measuring apparatus covers the measuring body can also be calculated in a corresponding manner, on the basis of knowledge of the distance between the measuring areas of the measuring apparatus over the road surface and the vehicle speed. This enables the measuring processes to be limited solely to those times at which the measuring body can be expected to be located in the measuring area of the measuring apparatus.

The physical construction of the measuring apparatus is of subordinate interest, and measuring apparatus that can be used in this respect are described in the aforesaid prior publications.

DESCRIPTION OF THE SEVERAL VIEWS OF THE DRAWINGS

The invention will now be described with reference to exemplifying embodiments thereof and also with reference to the accompanying drawing, in which FIG. 1 is a schematic side view of inventive apparatus; and FIG. 2 is a schematic plan view taken on the line II—II in FIG. 1.

DETAILED DESCRIPTION OF THE INVENTION

FIG. 1 shows a road surface 3 and a vehicle 1 that is driven along the road surface 3 and rests thereon with one wheel 2 that is suspended conventionally on the vehicle 1.

Reference numeral 11 indicates the direction in which the vehicle is driven.

The wheel 2 exerts a known load on the road surface 3, over a loading area that corresponds to the abutment surface of the wheel 2 with the road surface 3. As the vehicle is driven along the road surface 3, the road surface will be subjected to elastic deformation in the form of a cup-shaped depression in said surface 3 around the area of contact of the wheel with said surface.

A measurement of the load bearing capacity of the road surface 3 can be established, for instance, by measuring the vertical distance between the main part of the vehicle 1 and a point 6 on the road surface 3, partly in the proximity of the area of contact of the wheel 2 with the road surface 3 and partly at a distance therefrom in the vehicle movement direction 11 where the measuring point 6 has either not been subjected to any influence by the load exerted by the wheel 2, or has had time to spring back after the load has been removed.

By determining the difference in vertical distance from a reference point in the vehicle 1, there can be obtained a measuring result which, together with knowledge of the magnitude of the load, the loading area and other available information, enables the bearing capacity of the road surface to be calculated in some known manner.

Shown in FIG. 1 is a laser 9 that emits light onto a measuring area closely adjacent to the lowermost point of the wheel 2, such as to illuminate a measuring area 6. A sensor 8 scans a selected measuring area 6, for instance the area of the road surface 3 illuminated by the laser 9, and determines the vertical distance of the measuring area from a vehicle-mounted reference plane, by determining the direction between, for instance, the scanning direction of the sensor 8 to the measuring point 6, and the horizontal plane.

A similar measuring arrangement 19, 18 is disposed at a given distance from the arrangement 9, 8 in the direction 11. When the distance between the sensing or detection areas of the measuring arrangements 8, 9; 18, 19 on the road surface and the current speed of the vehicle are known, it is possible to determine a corresponding time gap so as to enable the measuring process to be carried out with the aid of the sensor 18 on precisely the same measuring location 6 as that measured by the first sensor 8.

According to the invention, there is provided a vehicle-carried device 5 that function to throw a measuring body 16 onto the road surface in the path scanned on the road surface 3 by the field of view of the two sensors 8, 18. The asphalt ball 16 is shot forcibly from the vehicle, for instance with a burst of compressed air, and consists of relatively soft asphalt, so that the ball 16 will stick firmly to the road surface 3 and be flattened on impact. The ball 16 will then have a smooth rounded upper surface 6 that defines the measuring area.

The body 16 can be easily detected by the sensor 8, 18, when the upper surface of the measuring body 16 is located at a significant distance above the road surface. The distance between the upper surface of the ball and the reference plane is unambiguous, when the upper surface of said ball is smooth. When the ball 16 has a small diameter, the position of the ball can be determined very accurately, as can also its vertical distance from the reference plane.

It is also easy for the sensor 18 to detect the body 16' and to determine the distance between the reference plane and the upper surface of the body with corresponding precision. Because the distance between the measuring areas of the respective measuring arrangements 8, 9 and 18, 19 are known, it is possible to ensure on the basis of the current speed of the vehicle that the second measuring process will be carried out solely in the region of the body 16.

The measuring point of the second measuring process is referenced 6' in FIGS. 1 and 2.

FIG. 2 shows schematically that an inventive apparatus can include a plurality of measuring arrangements each comprising the elements evident from FIG. 1, although separated laterally, for providing measuring information with respect to the shape of the indentation formed in the road surface 3 by the load exerted by the wheel 2.

It will be understood that several distance measurements can be made with respect to the body 16 at different length positions along the vehicle 1.

It will also be understood that the device 5 can be mounted to project measuring bodies 16 immediately behind the wheel 2, and that the distance of the body will then be measured in several positions behind said wheel.

It has been said that the body 16 may consist of asphalt. However, by way of an alternative, the body may consist of pieces of adhesive tape or the like that are applied in some way to the road surface 3, these bodies 16 having the property of being easily discerned against the background of the road surface and also of providing a measuring surface that is smooth, and preferably smoother than a typical road surface. The measuring body will preferably have a small area.

What is claimed is:

1. A method of determining the resilience of a road surface (3), wherein a vehicle (1) is caused to move along the road surface (3), and to subject said surface to a given force in a small loading area which follows the vehicle (1), wherein at least two measuring processes are carried out at one and the same measuring position on the road surface, wherein said two measuring processes are carried out at mutually different distances from the loading area, and wherein. said measuring processes are carried out by contactless detection of the distance between the measuring points (6) and a vehicle-carried reference, characterised by applying a measuring body (16) to the road surface and utilising the free surface of said body (16) as a measuring point (6).

2. A method according to claim 1, characterised by a measuring body (16) that has an exposed surface which is smoother than the road surface (3).

3. A method according to claim 1, characterised in that the measuring body is chosen to establish a measuring surface that lies significantly above the road surface.

4. A method according to claim 1, characterised in that the measuring body is chosen to be easily detected against the background of the road surface.

5. A method according to claim 1, characterised in that the measuring body is comprised of
   a ball of plastic material that is shot firmly onto the road surface in the movement path of two vehicle-carried measuring arrangements.

6. Apparatus for determining the resilience of a road surface (3), including a vehicle (1) that is caused to move along the road surface (3) and that has means (2) for exerting a given load on said surface within a small load area that follows the vehicle as the vehicle moves along said surface, measuring means (8, 9; 18, 19) for contactless determining the distance between a vehicle-carried reference and a measuring point (6), wherein the measuring means has associated therewith means for determining the distance between a measuring point at a chosen position on the road surface and a vehicle-carried reference level at two different positions along the vehicle (1), characterised in that the apparatus includes a device (5) for applying a measuring body (16) to the road surface (3) in the movement path of said measuring devices; and in that the distance measuring means functions to determine the distance between the reference level and the upwardly facing side of the measuring body.

7. Apparatus according to claim 6, characterised in that the device (5) that functions to apply a measuring body (16) to the road surface (3) includes means for projecting a measuring body (16) onto said road surface (3).

8. Apparatus according to claim 6, characterised in that the measuring body is comprised of a ball of plastic material; and in that the body applying device is a compressed-air cannon.

* * * * *